No. 738,404.

Patented September 8, 1903.

UNITED STATES PATENT OFFICE.

MAX BUCHNER, OF MANNHEIM, GERMANY, ASSIGNOR TO C. F. BOEHRINGER & SOEHNE, OF MANNHEIM-WALDHOF, GERMANY, A FIRM.

PROCESS OF REDUCING NITRO COMPOUNDS.

SPECIFICATION forming part of Letters Patent No. 738,404, dated September 8, 1903.

Application filed August 19, 1901. Serial No. 72,585. (No specimens.)

*To all whom it may concern:*

Be it known that I, MAX BUCHNER, a citizen of the German Empire, residing at Mannheim, in the Grand Duchy of Baden, Germany, have invented certain new and useful Improvements in the Art of Reducing Nitro Compounds; and I do hereby declare the following to be a full, clear, and exact description of the invention, such as will enable others skilled in the art to which it appertains to make and use the same.

My invention relates to an improved process for the production of amins from the corresponding nitro compounds, the object of the same being to employ a metal for this purpose which may be readily recovered from the reducing-bath, and therefore again employed for the reduction of further quantities of the nitro bodies. I have found that copper is capable of effecting the reduction of nitro compounds to the corresponding amins when acting on said nitro compounds in the presence of an acid. As the copper may readily be recovered by electrolysis, which is not the case with such metals as have heretofore been employed, there is a decided economy in the use of copper for the reduction of the nitro compounds to their corresponding amins.

My invention therefore consists, first, in reducing a nitro compound to its corresponding amin by the use of copper in the presence of an acid, and, second, in the recovery of the copper by electrolytic means.

My invention, morover, consists in such further methods and features as will be hereinafter set forth, and pointed out in the claims.

As a specific illustration of the manner in which my invention may be carried out I give herewith the following examples:

1. *Preparation of anilin from nitrobenzene.*—3.81 kilograms of copper are intimately and thoroughly mixed by stirring with six kilograms of concentrated hydrochloric acid of about thirty-eight per cent. strength and 12.3 kilograms of nitrobenzene in a vessel provided with a reflux cooler. Under these conditions the reduction proceeds with the development of heat. The stirring or agitation of the mixture is continued until the reduction is completed, which occurs in about two hours. The production of anilin is nearly quantitative.

2. *Production of meta-phenylene diamin from meta-dinitrobenzene.*—1.68 kilograms meta-dinitrobenzene are intimately mixed with 7.62 kilograms of copper and twelve kilograms of hydrochloric acid of the above strength, under the same conditions of treatment as in the example above given. The resulting product is meta-phenylene diamin. The copper may be recovered from the waste liquor by the usual electrolytic action, thus leading to a great economy in the manufacture of amins.

Having now fully described my invention, what I claim, and desire to secure by Letters Patent of the United States, is—

1. The process of reducing nitro compounds to their corresponding amins, which consists in acting on said nitro compounds with copper in the presence of an acid.

2. The process of reducing aromatic nitro compounds, which consists in reacting on the same with copper in the presence of hydrochloric acid.

3. The process of reducing aromatic nitro compounds, which consists in reacting upon the same with copper in a hydrochloric-acid bath, and thereupon recovering the copper by electrolysis.

4. The process of reducing nitro compounds, which consists in reacting on the same with copper in the presence of concentrated acid.

5. The process of reducing aromatic nitro compounds, which consists in mixing copper and concentrated hydrochloric acid with the nitro compound, keeping the mixture cool and stirring the same.

In testimony whereof I affix my signature in presence of two witnesses.

MAX BUCHNER.

Witnesses:
JACOB ADRIAN,
H. W. HARRIS.